United States Patent [19]

Horrocks

[11] 4,075,480

[45] Feb. 21, 1978

[54] QUENCH DETERMINATION IN LIQUID SCINTILLATION COUNTING SYSTEMS

[75] Inventor: Donald L. Horrocks, Placentia, Calif.

[73] Assignee: Beckman Instruments, Inc., Fullerton, Calif.

[21] Appl. No.: 693,673

[22] Filed: June 7, 1976

[51] Int. Cl.² .................................................. G01T 1/00
[52] U.S. Cl. ....................................... 250/328; 250/252
[58] Field of Search ................... 250/328, 252, 363 R, 250/362, 364, 258

[56] References Cited

U.S. PATENT DOCUMENTS

| | | | |
|---|---|---|---|
| 3,381,130 | 4/1968 | Nather | 250/363 |
| 3,715,584 | 2/1973 | Rosenstingl | 250/362 |
| 3,721,824 | 3/1973 | Bristol | 250/328 |

*Primary Examiner*—Harold A. Dixon
*Attorney, Agent, or Firm*—Robert J. Steinmeyer; Robert R. Meads; John R. Shewmaker

[57] ABSTRACT

Method and apparatus for measuring the degree of quench in a liquid scintillation sample by irradiating the sample with a standard source, such as a cesium-137 gamma source, to produce a Compton scattered electron distribution exhibiting a Compton edge configuration as the leading edge thereof. For increasing the quench levels in the sample, the Compton edge shifts to lower pulse height values and the extent of this shift is indicative of the degree of quench. To measure the degree of quench, a unique point on the Compton edge, namely the point at which the second derivative of the edge is zero (i.e. the inflection point), is measured for the quenched sample and the pulse height value corresponding to the inflection point is determined. The pulse height value is compared with the pulse height value determined for a calibration standard in a similar manner, the difference in pulse height values indicating the degree of quench.

8 Claims, 17 Drawing Figures

FIG. 13
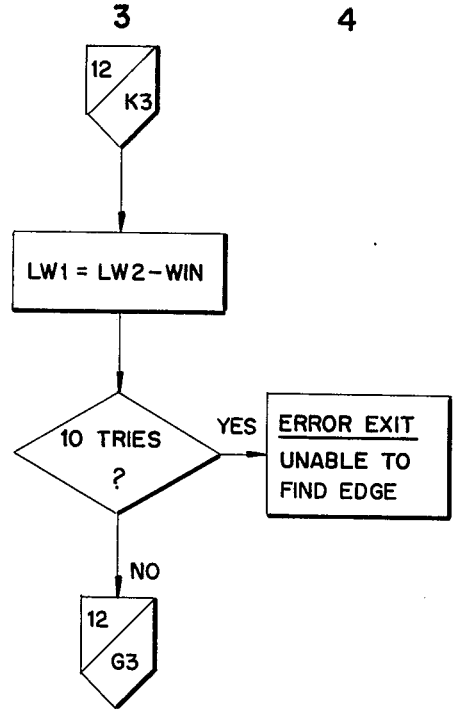
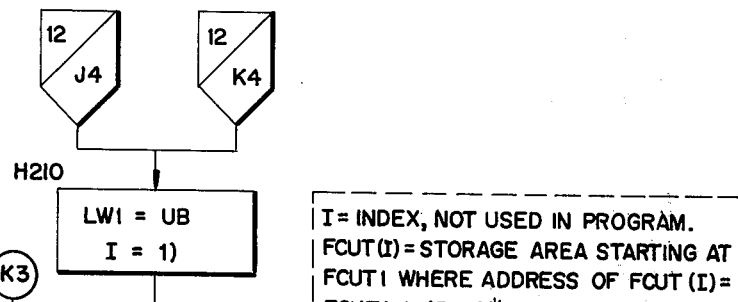
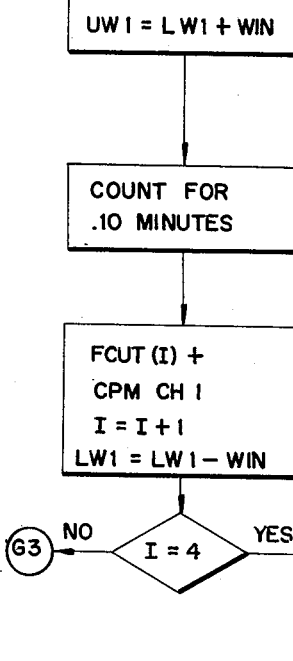

FIG. 16

```
         15
         J3
          ↓
       PASS = 1
```

PASS 1 USES CHANNEL 1 DATA.
PASS 2 USES CHANNEL 2 DATA.

COMPUTE FIRST DERIVATIVES

D3 = FCUT(2) − FCUT(1)
D2 = FCUT(3) − FCUT(2)
D1 = FCUT(4) − FCUT(3)

D1 < D2 ≥ D3 ? —YES→ $\text{INFL} = \dfrac{(D1-D2) \cdot \text{WIN}}{(D1-D2)-D2-D3} + \text{UB} - 2 \cdot \text{WIN}$

NO ↓

DATA SHIFTED TWICE ? —YES→ PASS = 2 ? —YES→ ERROW EXIT

NO ↓                    NO ↓

FCUT(I) = FCUT(I+1) FOR I=1 TO 5

FCUT(I) = FCUT(I+6) FOR I=1 TO 6

SHIFT IN CH 2 DATA

UB = UB − WIN

PASS = 2

(C3)            (C3)

QUENCH DETERMINATION IN LIQUID SCINTILLATION COUNTING SYSTEMS

BACKGROUND OF THE INVENTION

This invention relates generally to liquid scintillation counting systems and, more particularly, to improvements in methods and apparatus for determining the degree of sample quenching in such counters.

Liquid scintillation techniques have been widely adopted to measure the count rate or activity of samples containing radionuclides. The radioactive sample, typically a beta emitter, is placed in direct contact with a liquid scintillation medium by dissolving or suspending the sample within the medium. The liquid scintillation medium comprises a solvent or solvents, typically toluene or dioxane, and solute or solutes present in a few percent by weight of the solution. The liquid scintillation solution consisting of the solvent(s), the solute(s), and the radioactive sample are placed within a sample vial for measuring the radioactive emissions within the liquid scintillator. It is theorized that most of the kinetic energy from the nuclear decay events of the radioactive sample is absorbed by the solvent and then transferred to the solute which emits photons as visible light flashes or scintillations. The amount of emitted light is proportional to the amount of energy absorbed from the decay events. The scintillations are detected by a photomultiplier tube or other light responsive device which converts the energy of each scintillation to a voltage pulse having a pulse height proportional to the energy of the detected scintillation.

To derive a pulse height spectrum of the test sample, the output electrical pulses from the photomultiplier are amplified and fed to a plurality of parallel counting channels of a multi-channel spectrum analyzer. Each channel typically includes a pulse height analyzer with discriminators which establish a channel counting "window" having upper and lower pulse height limits. Each counting channel therefore counts the total number of pulses produced having pulse heights within the window limits of the channel. By establishing plurality of counting channels having window settings which span a range of pulse heights and by counting the number of pulses falling within each channel, a pulse height spectrum is obtained for the particular radioactive sample. Since the output pulse heights from the photomultiplier are proportional to the energy of the corresponding scintaillations, the pulse height spectrum derived by the spectrum analyzer corresponds to the energy spectrum of the nuclear radiation emitted by the test sample.

It is well known that radioactive samples or materials present in a scintillation medium can adversely effect the process by which the scintillations are produced. For example, the emission of photons can be prevented or emitted photons can be absorbed. Further, some events can be reduced to a level which is below the minimum detection level of the photomultiplier. Such effects are commonly referred to as "quenching" and in each case result in a reduction in the number of photons detected by the photomultiplier. When quenching results in a reduction of the level of some events below the detection level of the photomultiplier, the measured count rate will be lower than that produced by the same amount of the radionuclide in an unquenched sample. This is commonly referred to as a decrease in "counting efficiency".

Quenching acts equally on all events produced by the same type of excitation particle, e.g. electron (beta), alpha, proton, etc. Thus if quenching is sufficient to reduce the measured response for one decay event by given percentage, it will reduce all given responses by the same percentage. The result is to shift the energy or pulse height spectrum to lower pulse height values, and this is commonly referred to as "pulse height shift".

A major effect has been directed to develop techniques for monitoring the level of quench and for correcting the measured pulse height response to compensate for the effect of quench. Several of the primary methods for measuring quench levels are the internal standard method, the sample channels ratio (SCR) method, the external standard counts (ESC) method, and the external standard channels ratio (ESCR) method.

Of the foregoing, the internal standard method is probably the oldest of the methods. In the internal standard method, a known amount of radionuclide of interest is added to a previously counted sample and the sample is recounted (with the radionuclide). The apparent increase in the counts provides an indication of the degree of quenching present.

While the measure of quench provided by the internal standards method is relatively accurate, the method is time consuming and tedious since it requires counting the sample twice. Moreover, the method presents a degree of hazard to an operator since it requires opening sample vials to add the internal standard radionuclide, typically by manually pipetting. Further, the radionuclide must be available in a form which can be added to the sample without altering the sample counting solution. In this regard, it is possible for the radionuclide to increase the quench level associated with the sample and, in the case of a contaminated pipette, to introduce variable amounts of quench which result in inordinately low counts for the radionuclide. Opening refrigerated samples to add the radionuclide can cause condensation of water, a strong quenching agent, within the sample containing vial. Beyond this, the internal standard method is destructive since, after combining the sample and the radionuclide, the sample can never be counted along again to recheck the original count.

In the sample channels ratio (SCR) method the sample spectrum is divided into two adjacent counting channels, and the ratio of counts in the two channels provides an indication of the degree of quenching. The ratio of counts in the two channels is calibrated with respect to radionuclide counting efficiency by measuring a series of standards of known radionuclide content and varying degrees of quench. The statistical accuracy of the sample channels ratio method is dependent upon the sample counting rate or total counts measured and, for this reason, the time required to obtain an accurate value of the sample channels ratio is often unacceptably long. As a result, the SCR method works well for high activity samples only.

The most common of the quench measuring methods are the external standard method (ESC) and the external standard channels ratio method (ESCR). Each employ an external gamma source to irradiate the liquid scintillator solution. A fraction of the gamma rays will interact with the scintillation solution to produce Compton scattering of electrons having a Compton scattered electron energy distribution or pulse height spectrum. The Compton scattered electrons are effected by quenching such that the resulting Compton scattered electron energy distribution or pulse height spectrum is shifted to lower pulse height levels.

In the external standard counts (ESC) method the sample is first counted alone. The external gamma source is then mechanically moved from a remote position to an operative position adjacent the sample vial, and counting is carried out for the gamms source in a specified counting window. A series of samples of varying quench level, but with known amounts of radionuclide, are measured to obtain a calibration curve of external standard counts or count rate as a function of sample counting efficiency. Thereafter, when an unknown sample is measured and the gamma source is moved into position to irradiate the sample, the degree of quenching in the unknown sample for the resulting sample count is derived from the calibration curve.

The external standard counts method has the advantages of being independent of sample activity and of being relatively rapid. However, the method is subject to significant errors because the number of Compton scattered electrons is affected by the volume of the sample solution, by the position of the gamma source relative to the sample, by the half-life of the gamma source, and by changes in electron density of the sample and its surroundings.

The external standard channels ratio (ESCR) method, described in U.S. Pat. No. 3,381,130, filed Aug. 16, 1965, and assigned to the assignee of the present invention, combines the use of an external gamma source and two counting windows. The Compton scattered electrons produce a distribution of pulses which are counted in the two windows and the ratio of the counts is used as a measure of the quench level. The Compton distribution is always the same at a given quench level, but will vary at different quench levels due to the pulse height shift caused by quench changes.

The external standard channels ratio method has the advantages of being rapid, independent of sample volume within certain limits, independent of the relative position of the gamma source and the sample, and independent of half-life of the gamma source. However, the method exhibits certain limitations since at some quench level, the ratio will become zero and further quench cannot be measured. Also as the ratio becomes small, the number of counts in one of the channels becomes small and the accuracy of the ratio becomes poorer.

For a sample having a given quench value, each of the above methods of quench determinations can provide different quench values depending upon, among other factors, how the user sets the counting windows for the counting operations. Thus, the same user measuring the same sample by the same quench determination method can obtain different values when, in fact, the sample has only one value of quench.

Another method of quench measuring which has been proposed in the literature and which also employs an external gamma source, involves measurement of the so-called "half-height" of the leading edge of the pulse height distribution of the Compton scattered electrons (this edge is commonly referred to as the Compton edge). The half-height of the Compton edge is established by measuring the peak height of the Compton pulse-height distribution to establish the count rate corresponding to the peak height. The peak count rate is then divided by two, and the location on the Compton edge which corresponds to this halved count rate is termed the "half height". The pulse height corresponding to this location is established and the relative shift of this pulse height for an unquenched and a quenched sample provides a measure of the degree of quench of the sample.

While the half-height method is theoretically attractive it presents certain problems of implementation. The major drawback of the half-height method is that it requires the peak height of the Compton pulse-height distribution to be measured. Unfortunately, it is difficult to measure the peak height with precision. First, it is necessary to count the sample for a long period of time in narrow windows around the peak in order to obtain sufficient counts to make a statistically accurate determination of the peak itself. Moreover, the difficulty in accurately defining the points is compounded as the degree of quench increases since the peak itself becomes more diffuse with increasing quench. Since the so-called half-height value is simply half of the peak value, it is evident that the half-height determination is no more accurate than the peak determination.

Improved liquid scintillation counters have been developed which monitor the level of quench using one of the above methods and which automatically make a correction to compensate for the quench. The effect of quench is to shift the pulse height spectrum to lower pulse height values thereby changing the relative position of the pulse height spectrum and the channel "windows" for counting the pulses. The automatic quench compensation methods, in effect, operate to re-establish the relative position of the pulse height spectrum and the channel windows. For example, British Patent Specification No. 1,226,834, corresponding to U.S. Pat. No. 4,029,401 filed July 3, 1967 and assigned to the assignee of the present invention, teaches several methods of automatic quench compensation by modifying selected system parameters in accordance with a measured quench value to restore relative positions of the counting channel "windows" and the pulse height spectrum. For example, the patent specification teaches that the gain of the photomultiplier tubes which detect the light scintillations may be adjusted to change the detected pulse heights and thus shift the pulse height spectrum. In addition, the patent teaches adjusting the window settings of the counting channels to shift the counting window to the correct region of the pulse height spectrum. Adjustment of the gain or channel window settings in the above manner automatically compensates for the level of quench.

While each of the previously described methods of measuring the level of the quench has proven satisfactory in some applications, they all suffer from one or more of the drawbacks enumerated above. As a result, automatic quench compensation systems incorporating any of these quench monitoring methods are inherently subject to the same drawbacks.

SUMMARY OF THE INVENTION

The present invention resides in method and apparatus for determining the degree of quench in liquid scintillation counting samples in a manner which overcomes the disadvantages of the prior art. To this end, the invention includes means for exposing a sample to radiation from a standard source to produce a Compton scattered electron distribution exhibiting a Compton edge as the leading edge thereof, means for measuring a unique characteristic of the Compton edge, preferably the inflection point where the second derivative of the edge is zero, and for ascertaining a pulse height value corresponding thereto, and means for comparing the pulse height value determined in a similar manner for a calibration standard, the difference in pulse height values being indicative of the degree of quench present.

In a preferred embodiment, a search for the Compton edge is conducted by counting in a plurality of first windows to ascertain the general region of the Compton edge, by counting in a second plurality of windows to locate the starting point of the edge within the general region, and analyzing the edge beginning at approximately the starting point thereof by calculating derivatives along the edge until the inflection point is located.

Determination of the inflection point in this manner and determination of its shift with increasing quench is extremely accurate and can be performed repeatedly on the same sample. Moreover, the invention is adapted to operate over a wide range of quench so that the invention exhibits a substantial improvement in accuracy and range over the prior art methods while also exhibiting all of the desirable features of the prior methods.

BRIEF DESCRIPTION OF THE DRAWINGS

FIGS. 11-16 are a combined flow chart of the steps implemented by hardware for carrying out quench determination in accordance with the present invention.

DESCRIPTION OF THE PREFERRED EMBODIMENTS

Figure 1:
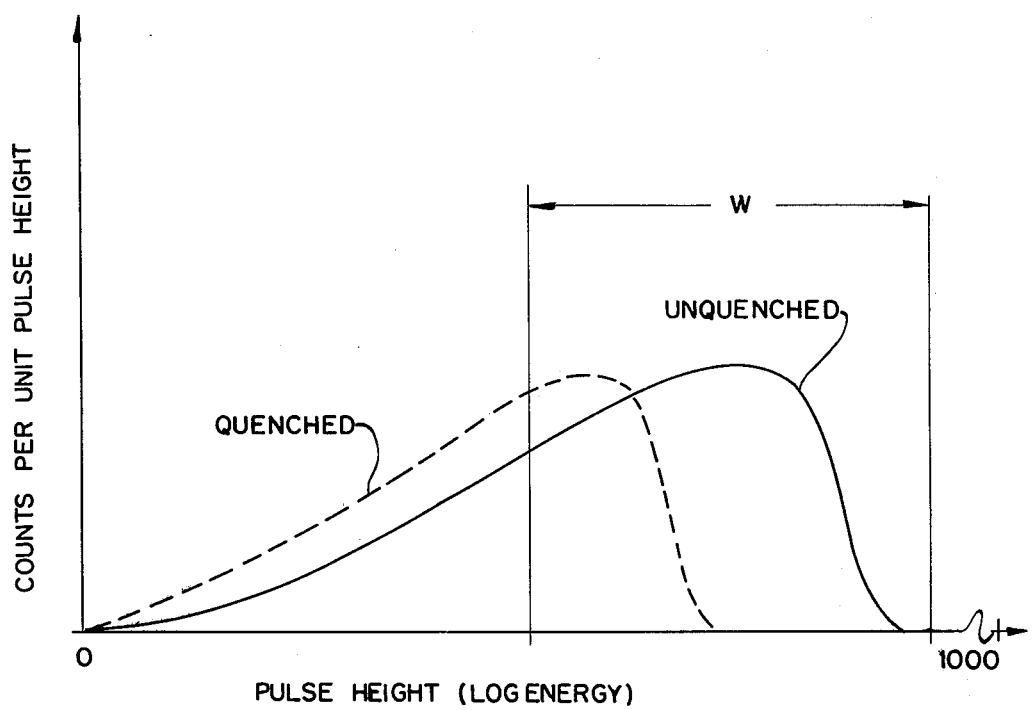
FIG. 1 is a graphical plot of the pulse height distribution illustrated as counts per time interval per unit pulse height vs. pulse height (in log energy) and illustrates the shift in pulse height distribution between an unquenched and a quenched sample.

Referring now to the drawings, FIG. 1 illustrates the effect of quenching upon the pulse height spectrum for a particular sample in a liquid scintillation medium. The solid curve indicates the spectrum obtained for an unquenched sample. Upper and lower settings of a counting channel "window" W are illustrated with the peak of the unquenched sample curve falling approximately at the middle of the counting window.

The dashed curve in FIG. 1 illustrates the pulse height spectrum of a quenched sample with the quench causing the pulse height spectrum to shift to lower apparent energy levels. As a result, the relative position of the counting window and the spectrum has shifted thereby causing a substantial change in the counting efficiency in the window. By establishing the degree of quenching, the relative position of the counting window and the pulse height spectrum can be restored to compensate for the effect of quench.

The pulse height spectrum curves in the application illustrate counts per time interval per unit pulse height (Y-axis) vs. pulse height (X-axis). The pulse height is shown as related to the logarithm of energy in a conventional manner. The pulse height axis is labeled in counting window units, arbitrarily from 0 to 1000. The counting window units correspond to discriminator divisions, as employed in a pulse analyzer, for example, for setting upper and lower limits of a counting channel by adjusting the discriminator settings of the analyzer.

Figure 2:
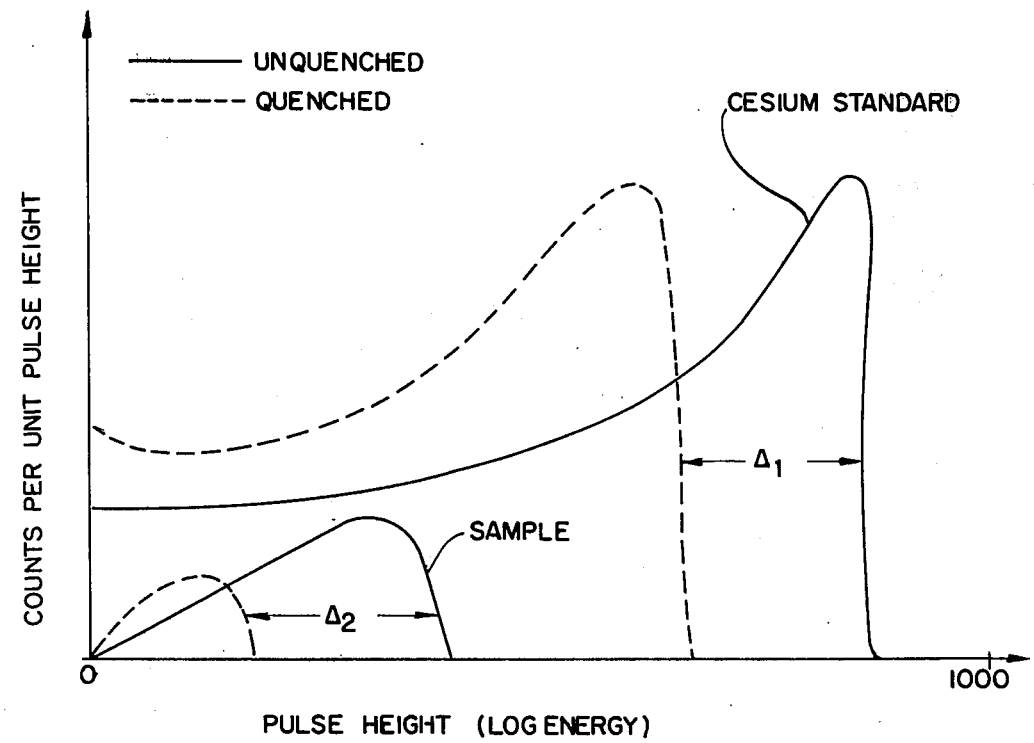
FIG. 2 is a graphical plot of the Compton scattered electron pulse height distribution of a sample exposed to a standard source together with the pulse height distribution of the sample alone.

The method of quench measurement in accordance with the present invention will become apparent with an understanding of the Compton scattering process produced by the interaction of radiation from a gamma or X-ray standard source with a liquid scintillation medium. In this regard, FIG. 2 illustrates the pulse height spectrum for a highly active external gamma standard source, such as cesium-137, which can be selectively positioned adjacent to a liquid scintillation sample containing vial by external standard positioning means well known in the art. The upper solid curve of FIG. 2 illustrates the cesium-137 pulse height spectrum for an unquenched sample, while the upper dashed curve illustrates the spectrum for a quenched sample. The lower pair of solid and dashed curves in the figure illustrate the spectrums of the same respective unquenched and quenched samples alone when the cesium-137 source is returned to a remote position operatively isolated from the sample. The shift in the cesium source spectrum due to quenching is labeled $\Delta_1$ while the corresponding shift in the sample spectrum is labeled $\Delta_2$. Since the spectral shifts are caused by the quenched samples, they are equal and $\Delta_1 = \Delta_2$.

Gamma rays and X-rays interact with matter in one of three ways, namely pair production, Compton scattering, and photoelectric effect. The Compton scattering process is the predominant mode of interaction for gamma rays having energies between about 20 KeV and 10 MeV. Thus, by choice of a radiation standard source which emits gamma radiation within this energy range, such as cesium-137, the Compton scattering process will be the predominant mode of interaction of the gamma rays with the interacting media (in this case, the liquid scintillation solution).

The Compton scattering process is unique in that it is the same regardless of the scattering media. The gamma rays collide with essentially free electrons in the medium and impart a part of their kinetic energy to the electrons producing a scattered gamma ray of energy less than the original gamma ray energy. Total energy and momentum are conserved, however, in the scattering process. The distribution of scattering electrons and their energies is predictable and is a function of the energy ($E_\gamma^0$) of the original gamma ray. Since the gamma ray never imparts its total energy to the electron, the scattered electrons will have energies from zero to some maximum energy, $E_{max}$, which is less than $E_\gamma^0$. The value of $E_{max}$ is given by the equation:

$$E_{max} = 2(E_\gamma^0)^2/(2E_\gamma^0 + 0.51)$$

where $E_{max}$ and $E_\gamma^0$ are expressed in MeV and 0.51 is the rest mass equivalent in MeV for one electron.

Figure 3:
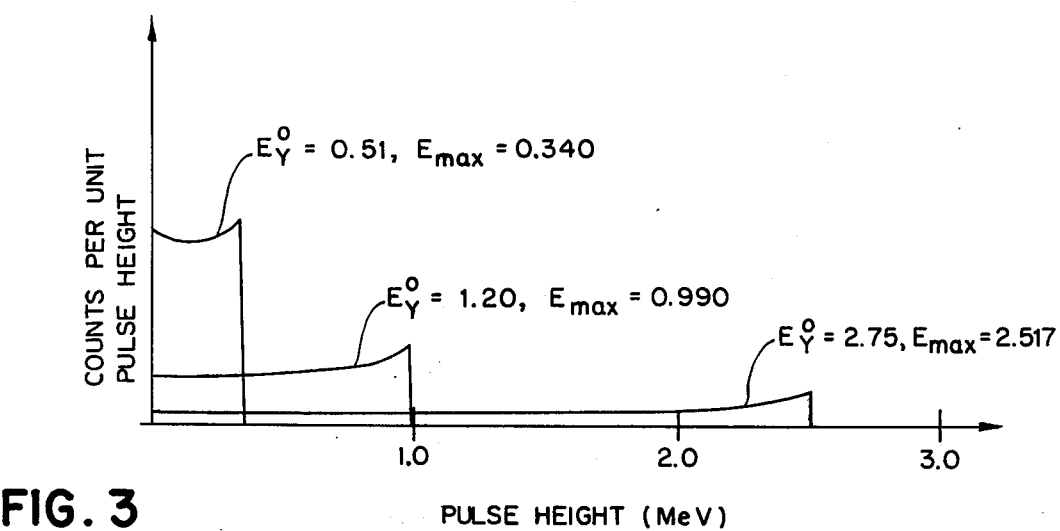
FIG. 3 is a graphical plot of the Compton scattered electron energy distribution of three gamma rays together with a tabulation of the maximum energy ($E_{max}$) produced by each gamma ray energy.

The theoretical Compton scattered electron energy distributions for three different gamma rays are shown in FIG. 3. For the three values of $E_\gamma^0$, the corresponding values of $E_{max}$ are indicated on the drawing. The leading edge of the Compton scattered electron energy distribution (i.e. the Compton edge) not only corresponds to a unique energy, $E_{max}$, but the edge is very sharp. These two properties make the Compton edge very useful as a quench level monitor in accordance with the present invention.

Figure 4:
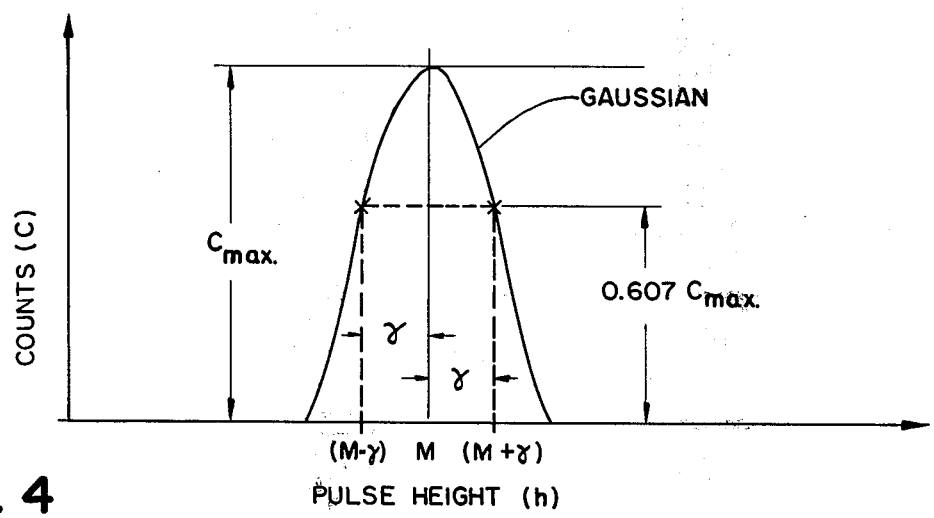
FIG. 4 is a graphical illustration of a Gaussian distribution.

The Compton scattered electrons of energy $E_{max}$ are mono-energetic. That is the $E_{max}$ scattered electrons each have only one energy value. The response of a liquid scintillation solution to mono-energetic electrons of energies greater than several KeV can be represented by a Gaussian distribution. FIG. 4 illustrates a Gaussian distribution where the abscissa $h$ represents pulse height response and the ordinate $c$ represents counts per unit $h$. The equation for $c$ as a function of $h$ is:

$$c = \frac{1}{\sigma\sqrt{2\pi}} e^{-(h-m)^2/2\sigma^2}$$

where $2\sigma$ is the width of the distribution between two values of $h$ at the value of $c$ which is 0.607 of the maximum value of $c$, and where $m$ is the value of $h$ at the maximum value of $c$.

In accordance with a primary aspect of the present invention, a unique point of such a distribution has been found to be where the value of $(h-m)$ is exactly equal to $\pm\sigma$. At this point the values of the first and second derivative of $c$ are given by the equations:

$$\frac{dc}{dh} = \frac{\frac{-2(h-m)}{2\sigma^2}}{\sigma\sqrt{2\pi}} e^{-(h-m)^2/2\sigma^2}$$

$$\frac{dc}{dh} = \frac{1}{\sigma^2\sqrt{2\pi e}} \text{ (i.e. a maximum),}$$

and $$\frac{d^2c}{dh^2} = \frac{\frac{-2(h-m)}{2\sigma^2}}{\sigma\sqrt{2\pi}} \cdot \frac{-2(h-m)}{2\sigma^2} e^{-(h-m)^2/2\sigma^2}$$

$$+ \frac{\frac{-2}{2\sigma^2}}{\sigma\sqrt{2\pi}} e^{-(h-m)^2/2\sigma^2}$$

$$\frac{d^2c}{dh^2} = 0.$$

Figure 5:
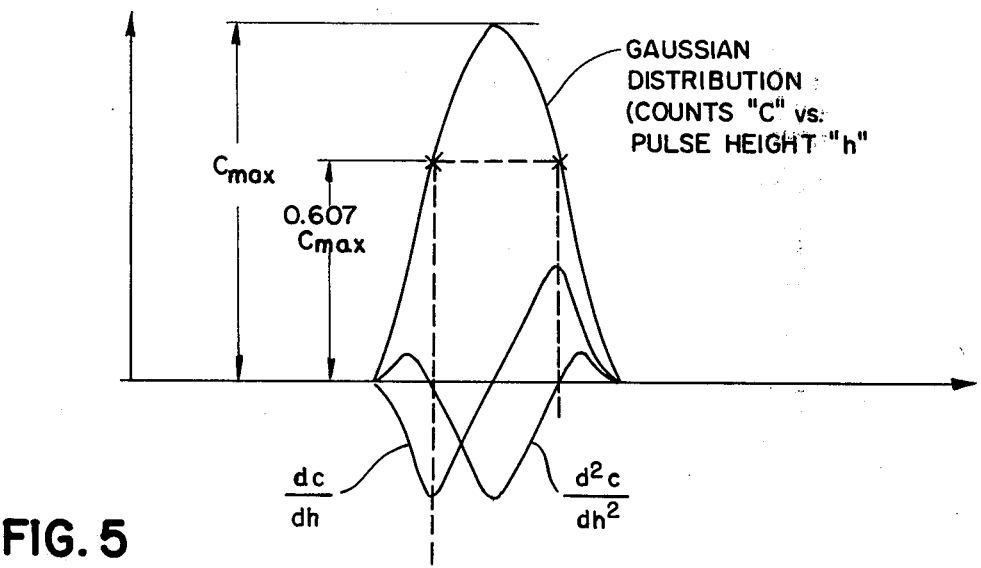
FIG. 5 is a graphical illustration of the Gaussian distribution of FIG. 4 together with the first and second derivatives thereof.

Thus, a unique point on each edge of the Gaussian distribution is the inflection point of the edge at which the second derivative equals zero. FIG. 5 illustrates, as a function of $h$, the curves of $c$, and the first and second derivatives thereof.

Thus, the measurements of counts as a function of pulse height allows for the determination of $h-m$ which is equal to $\pm\sigma$. For example when a difference in adjacent measured values of $c$ shows a maximum ($\pm \Delta c$ = max), the corresponding value of $h$ will be equal to $(m \pm \sigma)$. Alternatively, when the differences between the calculated $\Delta c$ values is equal to 0, the corresponding value of $h$ will also be equal to $(m \pm \sigma)$.

It will be noted from FIG. 5 that each half of the Gaussian ($h<m$ and $h>m$) exhibits identical relationship for the first and second derivatives, except for the negative or positive sign thereof. Thus, analysis of only one half of the Gaussian curve will give an accurate measure of the value of $h$ which is equal to $(m \pm \sigma)$. This is important in the use of the Compton edge in accordance with the present invention to measure the degree of quench. There are electrons of energy less than $E_{max}$ which produce responses that swamp the lower half ($h<m$) of the Gaussian distribution produced by electrons of energy $E_{max}$. As a result, the lower half or the Gaussian distribution is distorted. However, since there are no electrons of energy greater than $E_{max}$, the upper half of the Gaussian distribution produced by electrons of energy $E_{max}$ is not distorted, and the Compton edge corresponds to the upper half ($h>m$) of the Gaussian distribution.

Figure 6:
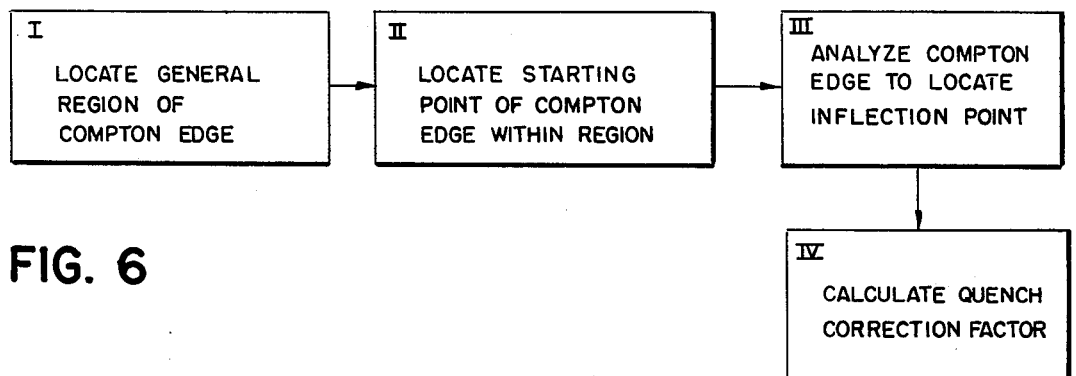
FIG. 6 is a block diagram illustrating the method steps of the invention.

The method of quench calculation in accordance with the present invention will become apparent from the observation of the curves of FIG. 2, previously discussed, in conjunction with the broad method steps involved in practicing the invention and outlined in FIG. 6. From the above discussion of the Compton scattering process, it will be appreciated that the Compton edge produced by the gamma standard source for the unquenched sample in FIG. 2 is shifted to lower values of pulse height (to the left in FIG. 2) for a quenched sample. In accordance with the present invention, a unique point is located on the Compton edge for the quenched sample. For the preferred embodiment described hereinafter, the unique point is the inflection point of the Compton edge, that is the point at which the second derivative of the Compton edge curve is zero. The degree of quenching is established by measuring the relative shift between the inflection point on the Compton edge of a quenched sample and the inflection point of an unquenched sample.

FIG. 6 illustrates the method steps for practicing quench calculation in accordance with a preferred form of the present invention. Initially, a search for the Compton edge is begun. In step I, the general region of the pulse height spectrum including the Compton edge is located. After having established a general region of the Compton edge, the starting point of the edge is located in step II. After finding the starting point of the Compton edge, the edge is analyzed in step III to locate the inflection point and the corresponding pulse height value. Thereafter, in step IV, the degree of quench is calculated by comparing the shift in the location of the inflection point (pulse height value), as calculated in step III for the quenched sample, with the location of the inflection point of an unquenched sample previously stored in the system.

Figure 7:
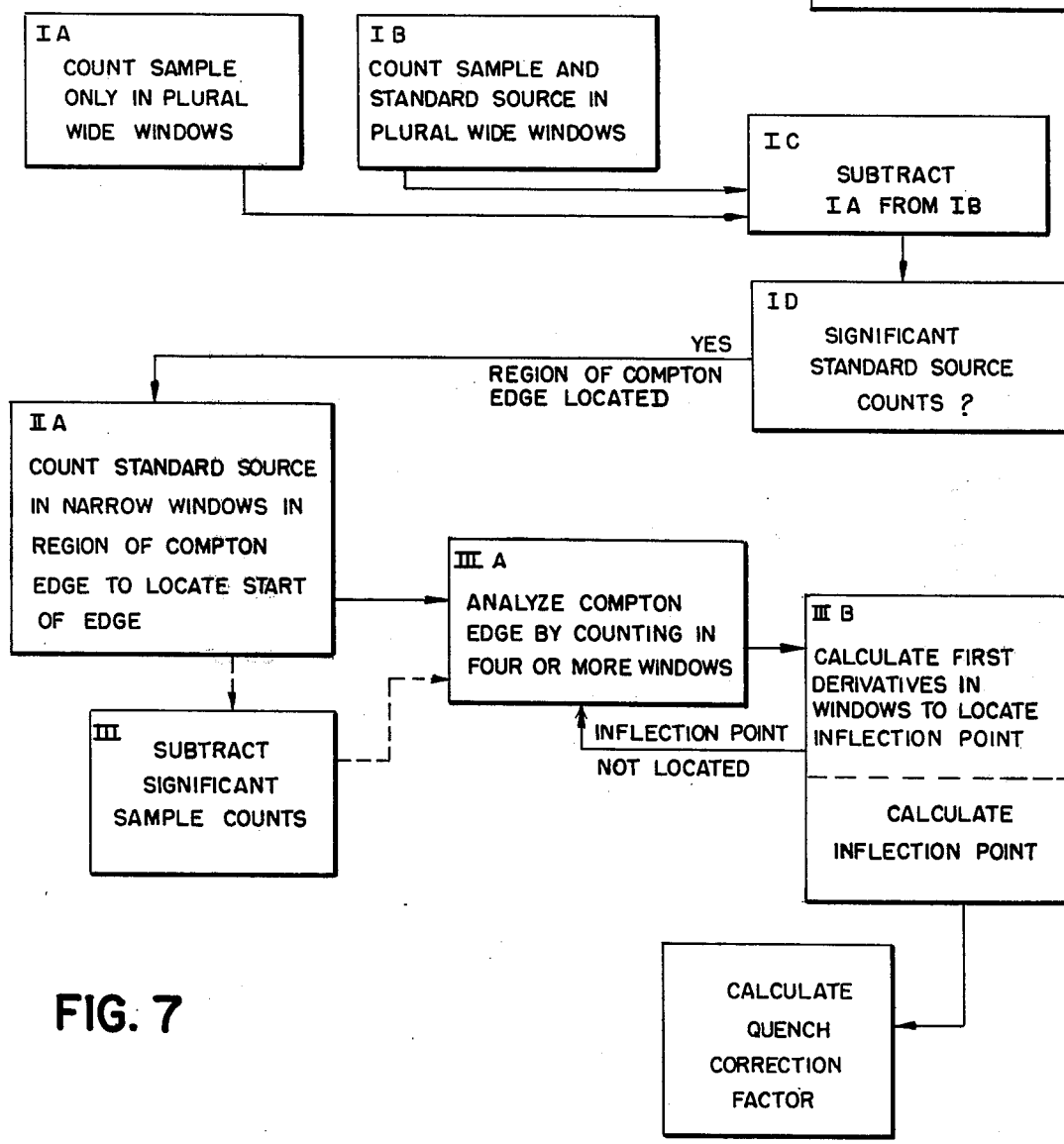
FIG. 7 is a block diagram illustrating further details of the method steps of FIG. 6.

FIG. 7 illustrates in greater detail and in block diagram form the method of FIG. 6. In order to expedite the search for the Compton edge, the spectrum is counted first in a number of relatively wide windows to locate the general region of the pulse height spectrum containing the Compton edge. As a convenient number, the pulse height axis may be divided into 12 windows $W_1$-$W_{12}$, and counts taken in each of the 12 windows.

Figure 8:
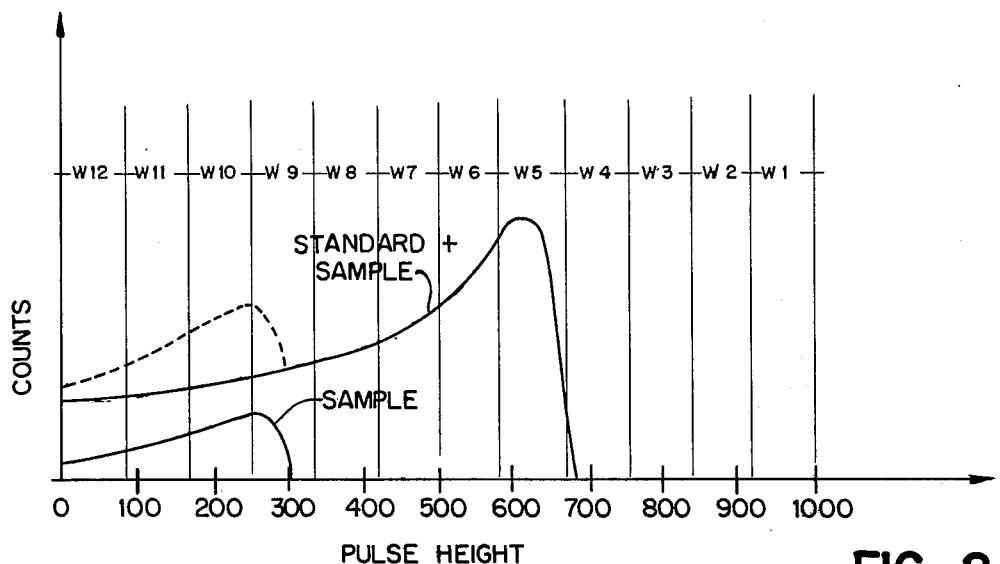
FIG. 8 is a graphical plot of a Compton scattered electron distribution for a quenched sample and illustrates 12 counting windows ($W_1$-$W_{12}$) spanning the pulse height axis.

Initially, in step IA of FIG. 7, the sample only is counted in these windows. Then, in step IB, the standard gamma source is positioned in operative proximity with respect to the sample and both the sample and the standard are counted in the same windows. FIG. 8 illustrates a typical pulse height distribution for the sample and the Compton pulse distribution with the 12 counting channel windows $W_1$-$W_{12}$ of equal width spanning the length of the pulse height axis.

In step IC, the results of step IA are subtracted from the results of step IB in each of the windows to ascertain the count rate due to the standard alone in each window.

In step ID, the count rate for the standard alone are compared to a reference or threshold count rate value to determine if the standard count rate is significant, i.e. is the standard count rate sufficiently high to indicate that the general region of the Compton edge has been located. In this regard, a preferred method for locating the general region of the Compton edge is to examine the counts obtained in each window in step IC for the standard alone beginning with window $W_1$ beyond the Compton edge and moving in succession through the windows (to the left in FIG. 8) until a significant count is obtained. Since the first several windows will contain few counts, the first window containing significant counts will indicate that the general region of the Compton edge has been found. Typically, the threshold count rate is established by counting the gamma standard in a wide open channel spanning the entire pulse height range and establishing the threshold count value as a percentage of the wide open count rate. For the exemplary pulse height distribution illustrated in FIG. 8, the first significant counts appear in window $W_5$ which has an upper window limit of approximately 667 divisions.

Figure 9:
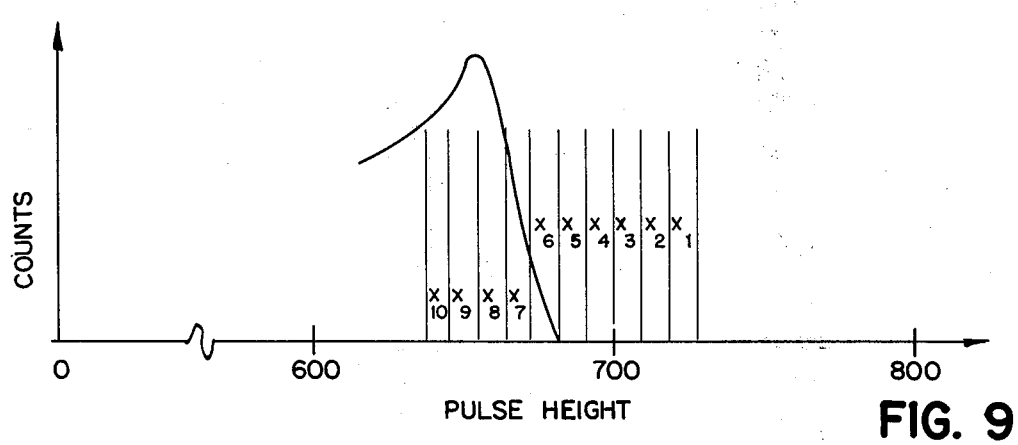
FIG. 9 is a graphical plot of a portion of the pulse height axis of FIG. 8 illustrating 10 narrow windows ($X_1$-$X_{10}$) for locating the start of the Compton edge.

After locating the general region of the Compton edge in steps IA–ID, the region of pulse heights close to the Compton edge are counted in a plurality of narrower windows to find the exact starting point of the edge in step II. The upper setting of the large window $W_5$ within which the Compton edge was found may be employed as a reference point and the narrower windows are established in successive fashion moving down the pulse height scale from the reference point. However, since the edge may actually start slightly beyond (to the right in FIG. 8) of the upper setting of window $W_5$, the reference point is preferably established a predetermined number of divisions beyond the upper setting of $W_5$. FIG. 9 illustrates 10 such narrow windows $X_1$-$X_{10}$, each nine divisions wide for example, with the upper limit of window $X_1$ set at the reference point just established. Counting is performed in windows $X_1$-$X_{10}$ in a similar manner to the prior counting in larger windows $W_1$-$W_{12}$. The gamma standard and the sample alone are counted in each window and the sample count, if any, is subtracted to obtain the count rate of the standard. When the count rate exceeds a second predetermined threshold value, determined in a manner similar to that previously described, the starting point of the edge has been located within an X window. In the example of FIG. 9, the edge starting point is located in window $X_6$ having an upper window setting of approximately 680 divisions.

Figure 10:
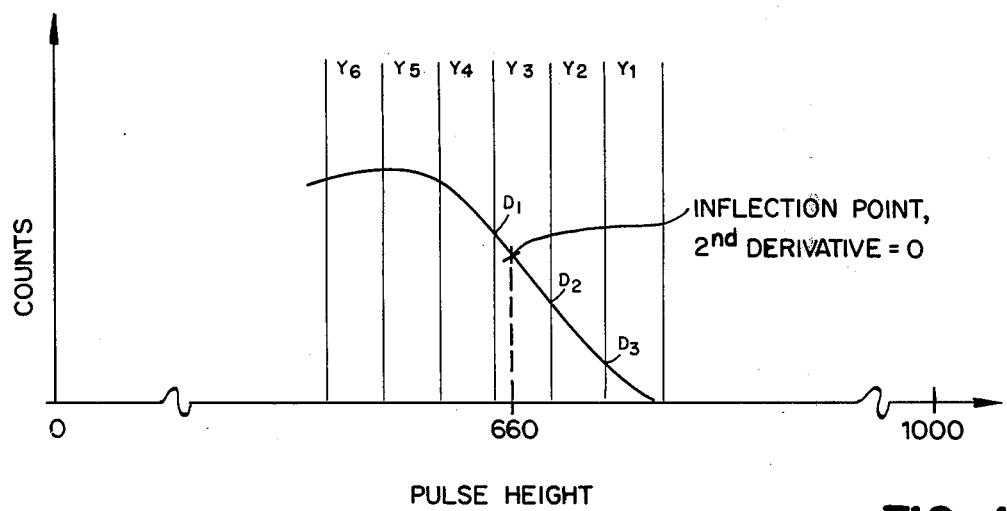
FIG. 10 is a graphical illustration of a portion of FIG. 10 illustrating a plurality of windows ($Y_1$-$Y_6$) for analyzing the Compton edge to ascertain the inflection point thereof.

Once the starting point of the Compton edge is established, and assuming first that significant sample counts do not exist in the region of the Compton edge, the edge itself is analyzed to find the point on the edge at which the second derivative is zero. This is accomplished in step IIIA (FIG. 7), and as illustrated in FIG. 10, by counting in four equal width windows $Y_1$-$Y_4$ along the Compton edge, starting approximately at the upper window setting of window $X_6$ within which the starting point of the edge was found, to obtain four count rates $C_1$-$C_4$ for the respective windows $Y_1$-$Y_4$. In step IIIB, three, first derivatives $D_1$-$D_3$ along the Compton edge are calculated from the four count rates $C_1$-$C_4$ by subtracting the measured count rates of adjacent windows in accordance with the following equations: $D_3 = C_2 - C_1$; $D_2 = C_3 - C_2$; and $D_1 = C_4 - C_3$. If the inflection point has been bounded by the derivatives, then the relationship $D_1 < D_2 > D_3$ will be satisfied. If the relationship is not satisfied, a new window $Y_5$ is established adjacent $Y_4$, and $Y_1$ is eliminated. Thereafter, the same calculation procedure is repeated for windows $Y_2$-$Y_5$ and new derivatives are calculated for these four windows. The process is repeated for new sets of four windows $Y_3$-$Y_6$, $Y_4$-$Y_7$, etc., until the derivative relationship is satisfied.

Assuming that the inflection point has been bounded by the derivative calculations thereby satisfying the foregoing derivative relationship, the inflection point itself is calculated by the following equation in step IIIB:

$$INFL = \frac{(D_1 - D_2) \times WIN}{(D_1 - D_2) - (D_2 - D_3)} + UB - 2(WIN)$$

where WIN is the width of the window and UB is the upper window limit of the first window of the set of four Y windows used for the derivative D calculations.

After establishing the location of the inflection point, the pulse height value (in discriminator divisions 0–1000) corresponding to the inflection point is determined and the relative shift between this pulse height value and the corresponding pulse height value determined in a like manner for an unquenched standard is determined in discriminator divisions. The relative shift provides a measure of the quench of the sample and is employed to generate a quench compensation factor for adjusting system parameters, such as gain or window settings, in a known manner as taught in the aforementioned British patent specification. For example, if the inflection point for the quenched sample corresponded to 660 discriminator divisions on the pulse height axis (as illustrated in FIG. 10), then the quench compensation factor would be the difference in discriminator divisions between 660 and the value obtained in a similar manner for an unquenched standard — for example 750 discriminator divisions. The compensation factor would be 750 − 660 = 90 discriminator divisions. Knowing this, a user may correct for the effect of the sample quench by, for example, readjusting the windows for measuring the sample 90 discriminator divisions down the pulse height axis (i.e. to the left in the Figures to lower energy values). In automatic quench compensations this may be automatically executed in a manner taught in the British specification.

Quench determination by measuring the relative shift in a unique point on the Compton edge (i.e. the inflection point) in accordance with the present invention combines the best features of the prior quench determination methods, to wit: (1) the external standard method (superior performance for weak samples and samples containing a plurality of isotopes); (2) the sample channels ratio method (insensitively to sample volume and system geometry), and (3) the external standard channels ratio method (geometry independence, half life independence, sample count rate correction, short time requirement by use of high count rate external standard, nonaltering of sample itself, etc.) without suffering from the disadvantages of such prior methods. One important advantage of the present invention is the fact that the inflection point of the Compton edge can be accurately determined irrespective of the degree of quench. Accuracy of the measurement of the inflection point is thus the same for either an unquenched or a highly quenched sample. Moreover, for a given sample, the inflection point can be repatedly determined with only variations due to normal statistical variations. In addition, determination of the inflection point is independent of the user's counting procedures, so that only the same correct value of quench is determined for a given quenched sample.

A further advantage of the present invention is the extended useful range of quench measurement. Since a single pulse height is measured (that height corresponding to the inflection point of the Compton edge) the only limitation on the method occurs when the Compton edge is quenched below the level of detection of the liquid scintillation counting system. By choice of a moderate energy gamma ray source, the range of quench measured can be extended greatly over the obtained with previous methods.

Referring now to FIG. 7, there is shown a liquid scintillation counting system adapted to perform the Compton edge measurements for quench determination in accordance with the present invention. The counter is arranged to measure radio-activity issuing from a sample indicated generally by 10 and comprising a vial disposed within a shielded counting chamber and containing the liquid scintillation solution and sample. The counting arrangement is a conventional coincidence counter and thus includes a pair of photomultiplier tubes 12 and 14 arranged to detect and convert the light scintillations of the sample and to produce output voltage pulses having amplitudes proportional to the photon energy of each scintillation detected. Each scintillation of the sample will be detected by both photomultiplier tubes thereby producing a pair of coincident output pulses for each decay event.

The output of each photomultiplier tube is coupled as an input to a conventional combined pulse summation circuit and logarithmic amplifier 16 which prepares the pulses for analysis by pulse height analyzer 18. The pulse height analyzer 18 selects pulses within a predetermined energy range or window for measurement and rejects all other pulses.

The output of each photomultiplier tube is also coupled as an input to a coincidence circuit 20 which produces an output signal upon receipt of coincident input pulses. The output signal from the coincidence circuit is coupled as a triggering input to a gate circuit 22. Gate circuit 22 has an input terminal for receiving the pulses passed by pulse height analyzer 18 and an output terminal for transferring these pulses to a scaler 24 for counting. When a scintillation is detected, the resulting coincident pulses are summed and amplified by amplifier 16 and supplied to pulse height analyzer 18. The coincident pulses also are fed to coincident circuit 20 producing an output signal therefrom which enables gate 22 to pass the pulses, if they fall within the predetermined window limits of the pulse height analyzer 18, to the scaler 24 for counting by the scaler.

The scintillation counting system is operated by a control 26. The control 26 directs the positioning of the sample 10 in the counting chamber by conventional sample positioning means 28. The control further actuates conventional external standard positioning means 30 for selectively positioning an external standard source, such as cesium-137, in an operative position for irradiating the sample 10. It will be appreciated by those skilled in the art that control 26 may be either automatic or manual. In this regard, the same 10 and the external standard source be manually positioned, if desired. Moreover, the upper and lower window limits of the pulse height analyzer 18 may be adjusted manually in a conventional manner by means of variable potentiometers (not shown) which supply analog voltage signals for establishing the analyzer discriminator settings.

The control 26 is used to perform the sequence of operations for the quench determination method of the invention. In this regard, to locate the general region of the Compton edge, the control 26 first commands the sample positioning means 28 to move the sample 10 into the counting chamber adjacent the photomultiplier detector tubes 12 and 14 so that a count can be taken of the sample in windows $W_1$-$W_{12}$ in FIG. 8. Where the pulse height axis extends 1000 discriminator divisions, each of the twelve windows $W_1$-$W_{12}$ would be approximately 83 discriminator divisions wide. The window setting inputs to the pulse height analyzer 18 are adjusted to establish the limits of window $W_1$, and sample 10 is counted in this window. The count rate so obtained from scaler 24 is noted and recorded. Thereafter, the window limits are reset to establish counting window $W_2$ and the sample is recounted and the count rate is then recorded. This procedure is repeated for each of the windows through $W_{12}$ to obtain a sample count in each window.

Control 26 then positions the external standard source into operative position adjacent the sample 10. The window settings of pulse height analyzer are reset to window $W_1$ and the combined count rate due to the standard source and the sample in this window is noted and recorded. The standard source is counted successively in remaining windows $W_2$, $W_3$, etc., until a count rate is obtained indicating that the general region of the Compton edge of the Compton scattered electron distribution has been found. For the example illustrated in FIG. 8, the first significant counts due to the standard source will appear in window $W_5$ and the general region of the Compton edge will thus be established as falling within window $W_5$. Of course, to preclude sample counts from being mistaken for standard source counts, the sample count in each window is subtracted from the combined count of the standard source and sample in each window. For the example of FIG. 8, however, sample counts do not appear until window 9, so that zero sample counts will have been subtracted in windows $W_1$-$W_5$ at the time the general region of the Compton edge has been found.

After locating the general region of the Compton edge in the above manner, the search for the starting point of the Compton edge is made by counting in narrower windows $X_1$-$X_{10}$ in the general region of the Compton edge. Windows $X_1$-$X_{10}$, in this case, may be approximately nine discriminator divisions wide. For this purpose, the upper window setting of window $X_1$ is set at least as high as the upper window setting of window $W_5$ in which the general region of the Compton edge was found. As pointed out previously, in order to ensure that the upper window setting of window $X_1$ is beyond the Compton edge, this setting may be established a given number of discriminator divisions to the right of the upper setting of window $W_5$. In any event, the limits of window $X_1$ are set, and counts are in $X_1$ and then in successive windows $X_2$, $X_3$, etc. In this regard, the X windows are counted for the sample alone and for the combined sample and standard source and the two values are noted and subtracted if sample counts appear in a given window. For the example of FIG. 9, the starting point of the Compton edge is found to appear in window $X_6$.

After finding the starting point in this manner, the Compton edge is analyzed, beginning at approximately the starting point, in order to locate the unique inflection point of the Compton edge. For this purpose a third set of discriminator windows are established for counting along the Compton edge and these are illustrated in FIG 10 as windows $Y_1$-$Y_4$ through $Y_n$ as needed.

It is necessary to count in at least four Y windows along the Compton edge to make the necessary three first derivative calculations. After obtaining the count rate (sample corrected if required) in the first four windows, the measured count rates of adjacent windows are subtracted in accordance with the equations previously given to calculate first derivatives $D_1$, $D_2$, and $D_3$. This establishes the slope of the Compton edge at three locations identified by $D_1$, $D_2$, and $D_3$ in FIG. 10. If the slope values $D_1$ and $D_3$ of the edge are less than the slope value $D_2$, then it is known that the inflection point must be between $D_1$ and $D_3$, and then it is only necessary to calculate its actual location between these two points. However, if $D_2$ is not greater than either $D_1$ or $D_3$ then the inflection point has not been bounded by the calculations, and the Compton edge is counted again in four windows. However, this time the first window $Y_1$ is eliminated and a new window $Y_5$ adjacent to $Y_4$ is added so that counting is performed in four windows $Y_2$-$Y_5$. The same three slope calculations are made for these four windows and for succeeding four windows $Y_2$-$Y_6$, etc., until the second of the three derivatives D is greater than the first and third derivative, indicating that the inflection point of the Compton edge has been bounded by the points on the edge having the first and third slope values.

Once the inflection point is bounded in this manner, the actual location of the inflection point is calculated from the equation previously given. Having found the inflection point, the pulse height value in discriminator divisions corresponding thereto is determined which, for the example of FIG. 10, is 660 discriminator divisions.

Figure 17:
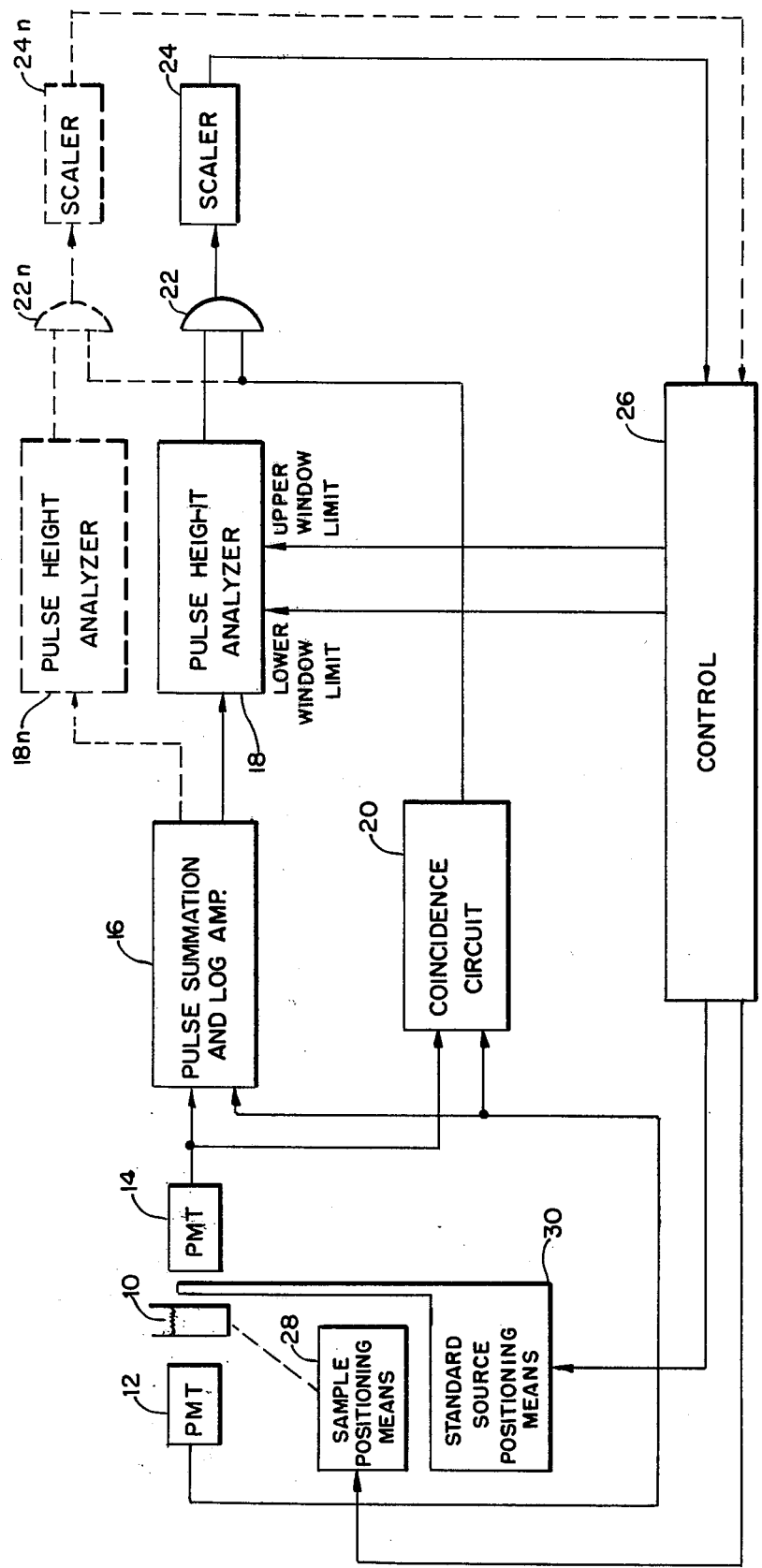
FIG. 17 is a combined block diagram schematic of a liquid scintillation counting system for practicing the present invention.

The liquid scintillation counting system of FIG. 17 has been described as incorporating a single counting channel comprising pulse height analyzer 18, gate 22, and scaler 24, with the window settings of the analyzer reset every time a new window is to be counted. In more elaborate systems, all conventional in the art, any number of additional parallel pulse height analyzers 18n, gates 22n, and scalers 24n (shown in dashed outline in FIG. 17) may be employed to count in more than one window at the same time. Such a system could be a standard multi-channel analyzer having, for example, 1000 parallel channels each with a window one discriminator division wide to span the entire pulse height axis of 1000 discrminator divisions. In such a system, the 1000 windows would be counted simultaneously.

While the liquid scintillation counting system has been described in basically its manual operation of control 26, the control 26 may take the form of an automatic control unit, such as a microprocessor with associated storage capability and control logic for directing the complete counting operation of the system automatically. In this regard, the particular hardware arrangement of a microprocessor is well known in the art and forms no part of the present invention. In general, a microprocessor includes a central processing unit, a read only memory, a read/write memory, and various controls for keyboards, displays, printers, and other instrument and parameter controls. Data can be transferred from the read only memory, into or out of the read/write memory, into or out of the central processing unit, from the keyboard control, and into the display, printer, and other instrument parameter controls. The central processing unit is configured to apply control signals to the memories and to the various other control features.

In order to determine the degree of quench in accordance with the present invention, a computer program containing control flow and analysis algorithms for locating and analyzing the Compton edge may be stored in a microprocessor memory together with programs for controlling channel window settings, for initiating and terminating counting operations, for temporarily storing the results of counting operation, and for performing calculations using the counting results.

FIGS. 11-16 illustrate an actual control flow chart for implementing the present invention in a microprocessor controlled system. The specific system implemented by FIGS. 11-16 comprises first and second counting channels the first of which comprises pulse height analyzer 18, gate 22, and scaler 24 and the second of which comprises pulse height analyzer 18n, gate 22n, and scaler 24n, all as illustrated in FIG. 17. With two such counting channels, the system may be controlled to count in one or the other channel or in both channels simultaneously. The counting windows to be set in each channel are established by the control 26 which supplies a digital signal for each channel to respective digital to analog converters (not shown). Each digital to analog converter supplies a corresponding analog signal to the respective pulse height analyzer to establish the analyzer discriminator settings and thereby set the upper and lower window limits of the pulse height analyzers of each counting channel.

To facilitate description, each block or operation in FIGS. 11-16 is identified as a point on a matrix. For this purpose each figure is labeled across the top edge thereof by numerals 1-5 and down the left edge thereof by letters A-K. Thus, any block of a figure may be identified by a letter-number pair. For example, in FIG. 11, the START operation is located at matrix point A3. To distinguish identical locations of the respective figures, the locations are identified in this description both by figure number and matrix points. Thus the foregoing START operation of FIG. 11 will be identified as 11/A3.

Figure 11:
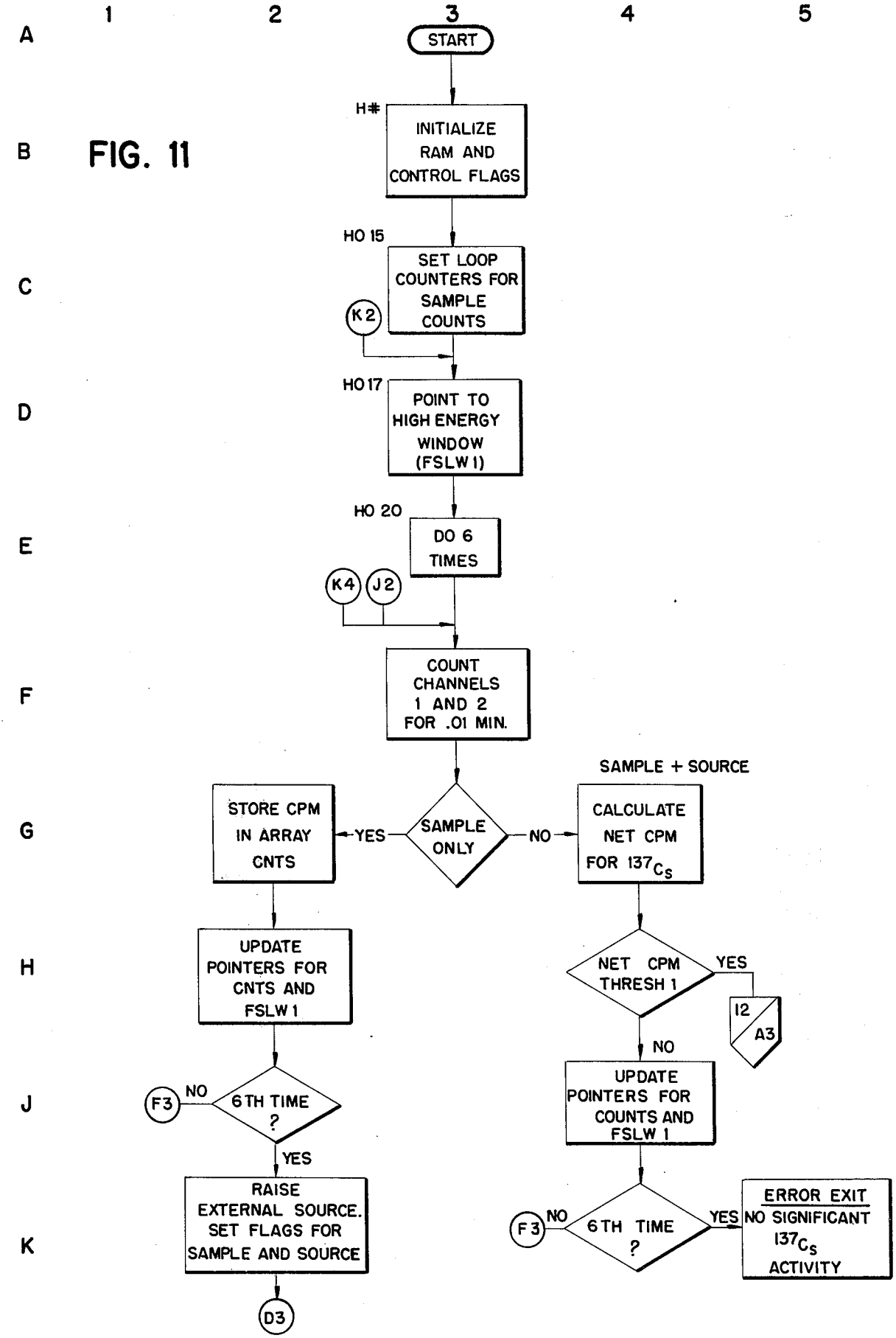

The flow chart of FIG. 11 shows the operations performed for locating the general region of the Compton edge. The first three operations in blocks 11/A3, B3, and C3 are initializing procedures for setting up the counters (scalers) and establishing other control parameters.

The initial window W at the high end of the energy scale is set in block 11/D3. Typically this setting will be in the neighborhood of 800–825 discriminator divisions. Since the system employs two counting channels, the first window $W_1$ is set in one channel and the adjacent window $W_2$ is set in the second channel. These two windows are counted together. Thus, by simultaneously counting a pair of windows in this manner, the 12 windows $W_1$–$W_{12}$ are counted in a total of six counting operations as indicated in blocks 11/E3 and F3. The total counting timer per window is approximately 0.01 minutes.

Initially the sample only is counted in windows $W_1$–$W_{12}$, and in block 11/G3 the question is posed whether the sample alone is being counted. If this question is answered "yes", then the results of the sample count are stored in block 11/G2 and the window settings are updated in block 11/G2 to count the next window. Block 11/J2 poses a question whether the six pairs of counting operations have taken place, and if they have not the counting operation begins again at block 11/F3. If the sixth operation has finished, indicating that the sample alone has been counted in each of the twelve windows, then in block 11/K3 the standard source is raised into position for counting both the sample and the source and the operation is returned to block 11/D3 for counting the sample and source in the windows $W_1$–$W_{12}$. As the sample and source are counted in each window, the previously stored sample count is subtracted from the combined sample and source count by the operation of block 11/G4 to establish the count rate of the Compton electrons of the standard source alone.

If the counts in each window are below a threshold value established at block 11/H4, then the next window is set and counting proceeds through the operations of blocks 11/J4 and K4 for counting the next windows. If the six counting operations have been performed without finding significant count activity above the threshold level, then there is no Compton distribution and such is indicated at block 11/K5.

Figure 12:
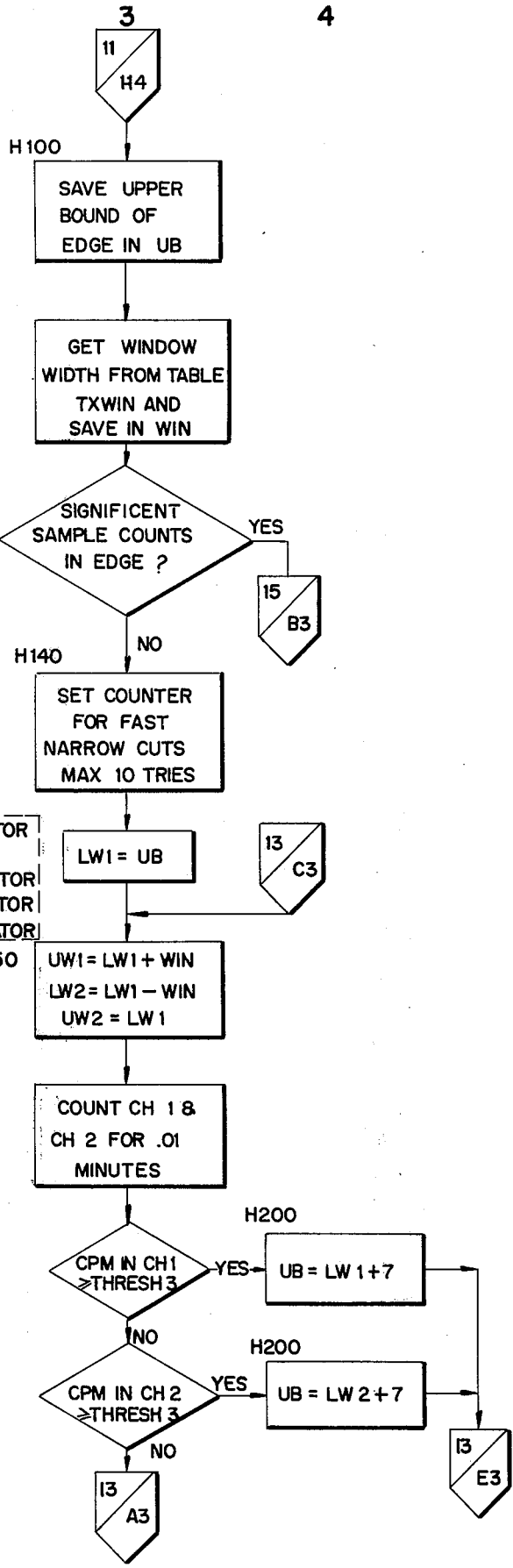

When a window is found to have significant counts above the threshold value (the threshold value may be 400 counts per minute, for example), the general region of the Compton edge has been located, and the affirmative answer to the question of block 11/H4 directs the operation to 12/A3 in FIG. 12.

FIG. 12 and FIG. 13 through block 12/D3 show the operations for establishing the starting point of the Compton edge within the general region just located.

The upper limit of the window W within which the general region of the edge was found, is saved in operation 12/B3 and in operation 12/C3 the window settings to be employed in narrower windows X (FIG. 9) for locating the starting point on the edge are retrieved from memory.

It has been found that when the general region of the edge is located in a window W, the edge will not normally extend down the pulse height scale more than one additional window W. Thus, before counting in narrow windows X, a check is made by operation 12/D3 to see if there were significant sample counts alone in these two W windows in the general region of the Compton edge. The operation of block 12/D3 checks the sample counts which were previously obtained in these two W windows and were stored at 11/G2. Assuming that significant sample counts do not exist, the window limits of two X windows are set in the respective two counting channels and counting is performed by the operations of blocks 12/EFGH3. When a threshold count value is exceeded in either channel window, in operation 12/J3 or K3, the starting point of the edge is set in either block 12/J4 or K4 as the lower window setting of the window in which the threshold is exceeded. In addition, in these operations, a predetermined number of discriminator divisions, for example 7, is added to this lower level setting to ensure that a reference point is thus defined which extends beyond the right end of the Compton edge.

If the threshold is not exceeded in operation 12/K3, the window limits are reset and counting is continued in successive pairs of windows X at operations 13/BCD3 until the starting point of the edge has been found.

Figure 14:
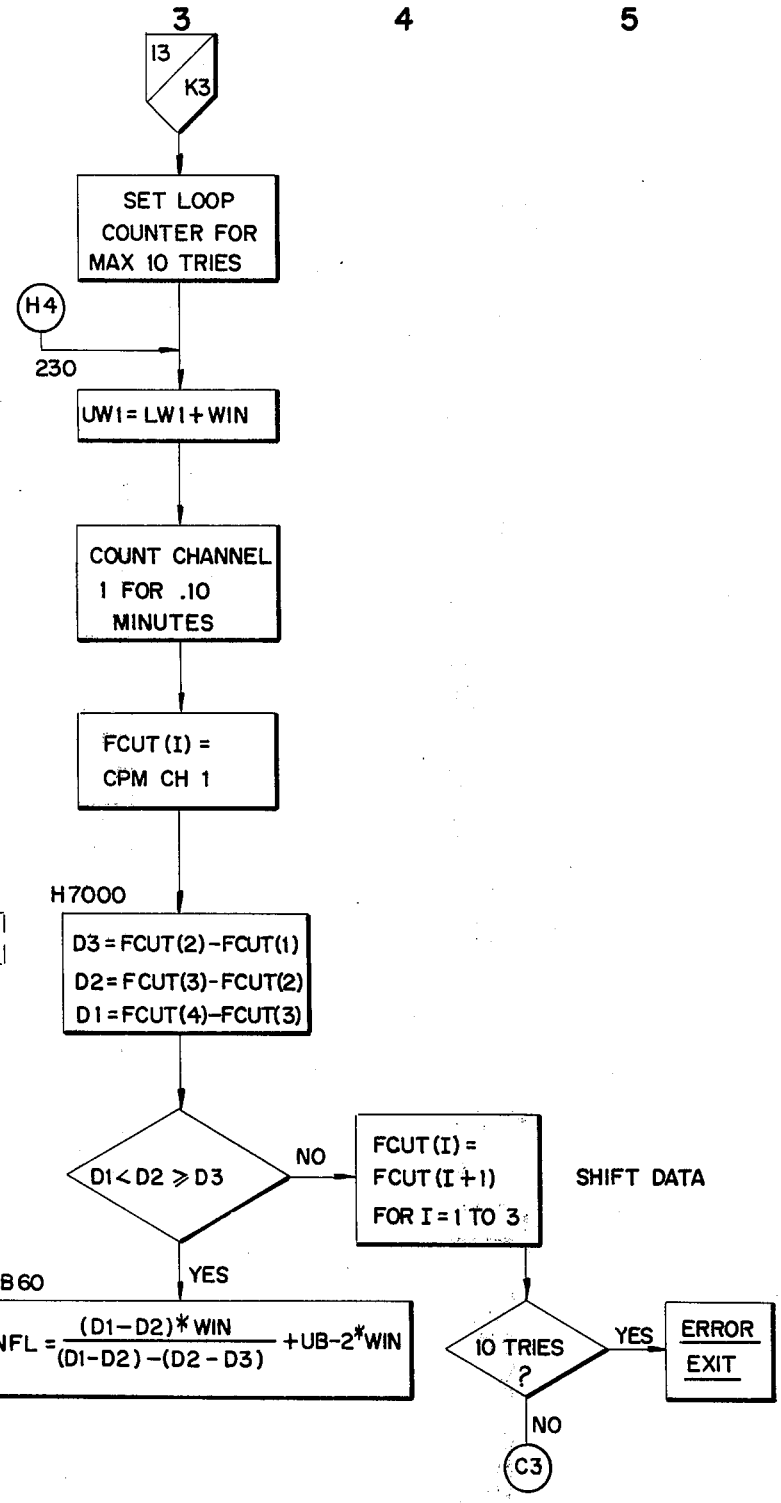
Figure 15:

If the starting point of the Compton edge has been established in either block 12/J4 or 12/K4, then the operations of FIGS. 13 and 14 beginning at 13/E3 and continuing through the remainder of FIG. 13 and the entirety of FIG. 14, are employed to analyze the Compton edge to locate the inflection point. This is done by counting along the Compton edge in four windows $Y_1$–$Y_4$ (FIG. 10). This counting is performed using one counting channel so that a series of four counting operations are performed in this channel. The appropriate window limits are set and counting is executed for approximately 0.10 minutes by the operations of blocks 13/F3. The count value for each window is stored by the operation of block 13/J3. When the fourth channel is to be counted, the operation of block 13/K3 directs operation to FIG. 14 where the fourth window is established and counted and the results stored by operations 14/A3–E3 in a similar manner.

After the count values for the four windows $Y_1$–$Y_4$ are stored, the first derivatives $D_1$, $D_2$, and $D_3$ along the edge are calculated in operation 14/F3 by subtracting the count values of adjacent channels in accordance with the equations previously listed.

The question is posed in operation 14/G3 whether the middle of the three derivatives (i.e. the middle slope value of the Compton edge) is greater than the outer two derivative or slope values. If it is, then that establishes that the derivative has changed sign between the first and third derivative values and that therefore the inflection point lies between the first and third values.

If the inflection point is not located by operation 14/G3, then a new window $Y_5$ is established and original window $Y_1$ is eliminated by the operation of block 14/G4, and new derivative calculations are made for channels $Y_2$–$Y_5$ until three derivatives are calculated the middle of which is greater than the remaining two.

Assuming that the derivative relationship is satisfied thereby establishing that the inflection point lies between the first and third derivative or slope values, the actual location of the inflection point is calculated in operation 14/H3.

Returning to FIG. 12 which illustrates the operations for locating the starting point of the Compton edge, operation 12/D3 posed the question whether significant sample counts were present near the edge. The preceding discussion has assumed that no sample counts were present. However, if significant sample counts were found, then operation 12/D3 directed the operation to FIG. 15 and beginning there and continuing through FIG. 16 the operations for locating the inflection point of the Compton edge where significant sample counts occur in an area of the Compton edge is shown.

At this point a search is conducted for the starting point of the Compton edge by counting in X windows the sample and the combined sample and standard and subtracting the sample counts from the total. The window containing the start of the edge is located, and a reference point with respect to this window is established from which to begin analyzing the edge to locate the inflection point.

Because significant sample counts exist in the region of the Compton edge, it is necessary to subtract them before calculating the derivatives along the Compton edge. For this purpose it is necessary to count the combined radiation standard and sample and count the sample alone and to subtract the sample count. In order to expedite this process, counting is performed in two windows (i.e. using both pulse height analyzers with their window settings offset with respect to each other for reasons that will become apparent) six counting operations are performed.

Initially the external standard is raised into operative position in block 15/B3 and the first and second windows are set at 15/C3 and D3, respectively. Assuming that the first counting channel is set at window $Y_1$ then the second counting channel is offset therefrom at window $Y_2$. Counting is performed at 15/E3 in both channels. Assuming that the sample and standard are being counted, then storage of the counts obtained is directed in blocks 15/F2 and G2 and the window limits are reset to the next window in 15/G3. Thus, the first counting channel is set in window $Y_2$ and the second counting channel is set in window $Y_3$. Thereafter, if counting has not been performed in six windows, block 15/H3 returns the counting operation to block 15/D3.

After six counting operations have been performed, the first counting channel will have counted windows $Y_1$-$Y_6$ and the second counting channel will have counted windows $Y_2$-$Y_7$. The data is stored for the four counting operations in the four sets of windows counted by channel 1 ($Y_1$-$Y_4$) and channel 2 $Y_2$-$Y_5$).

At this point block 15/J4 directs that the external standard be returned to an inoperative position and the counting operation returned to 15/C3 for counting the sample alone. As the sample is counted the question posed at 15/F3 directs subtraction of any sample counts from the previously stored combined counts in each channel by respective operations 15/F4 and G4, and the operation is repeated for six counting operations.

After the sample has been subtracted and counts have been stored for windows $Y_1$-$Y_6$ and for windows $Y_2$-$Y_7$, operation is directed to FIG. 16 for calculating the three derivatives $D_1$, $D_2$, and $D_3$ at block 16/C. In a first pass at calculating the derivative, the data from channel 1, namely windows $Y_1Y_2$, $Y_3$, and $Y_4$ is utilized to calculating the derivatives. If the derivative relationship at 15/D3 is satisfied, then the inflection point is calculated at 16/D4, 5 in the manner previously described.

If the derivative relationship is not satisfied, then the data stored for the next set of windows $Y_2$-$Y_5$ is designated in 16/F3 and G3 and the derivative computation of 16/C3 is repeated. After shifting the data twice in this fashion so that calculations will have been made for windows $Y_3$-$Y_6$, operations 16/EF and G3 analyze data from the other channel (i.e. $Y_4$-$Y_7$) and the derivative computations are made again in 16/C3 as before. It will be understood that if the counting windows in the first and second channels are offset by a plurality of windows, then there will be a greater number of remaining stored values in the second channel, i.e. $Y_4$-$Y_7Y_5$-$Y_8$, etc., so that it is possible to continue to calculate the inflection point without having to repeat the counting steps.

Locating the unique inflection point on the Compton edge for a quenched sample in the above manner and measuring the shift of the inflection point along the pulse height axis from the inflection point determined for a calibration standard provides a new and improved method for determining the degree of quench in a liquid scintillation sample. Quench determination in accordance with the invention is extremely accurate and can be determined over a wide quench range. Moreover, the shift in the inflection point can be used to correct for quench by shifting counting windows a corresponding amount to properly align the counting windows a pulse height distribution or by adjusting the photomultiplier tube gain to shift the pulse height distribution as taught in the aforementioned British patent specification. Moreover, it will be understood that while preferred embodiments of the invention have been illustrated and described, various modifications can be made therein without departing from the spirit and scope of the invention as defined in the following claims.

What is claimed is:

1. A method of measuring the degree of quench associated with a sample in a liquid scintillation medium comprising the steps of:

exposing the sample to radiation from a standard source for interaction therewith to produce Compton scattering of electrons having a Compton scattered electron energy distribution or pulse height spectrum, the pulse height spectrum being defined at a high energy end thereof by a Compton edge configuration;

analyzing the shape of the Compton edge to identify a unique characteristic of the Compton edge and measuring a pulse height value corresponding thereto; and comparing the pulse height value measured for the sample with a pulse height value measured in a like manner for a calibration standard, the difference in the measured pulse height values being indicative of the degree of quench present in the sample.

2. A method of measuring the degree of quench associated with a sample in a liquid scintillation medium comprising the steps of:

exposing the sample to radiation from a standard source for interaction therewith to produce Compton scattering of electrons having a Compton scattered electron energy distribution or pulse height spectrum extending along a pulse height axis, the pulse height spectrum being defined at a high energy end thereof by a Compton edge configuration;

analyzing the shape of the Compton edge to identify a unique point on the edge and measuring the pulse height value corresponding thereto; and comparing the pulse height value measured for the sample with the pulse height value measured in a like manner for a calibration standard, the difference in the measured pulse height values being indicative of the degree of quench present in the sample.

3. A method of claim 2 wherein the unique point is the point at which the rate of change of the slope of the Compton edge equals 0.

4. A method of claim 3 wherein the step of analyzing includes the steps of:

counting in a first plurality of windows to locate the general region of the Compton edge along the pulse height axis;

counting in a second plurality of windows in said general region of the Compton edge to locate a starting point of the edge; and counting from approximately said starting point of the Compton edge in a third plurality of windows; and calculating the unique point of the Compton edge from the counts obtained in the third plurality of windows.

5. A method of claim 4 wherein the steps of counting in said first, second and third plurality of windows includes the steps of:

ascertaining the combined count rate of the standard source and the sample;

ascertaining the count rate of the sample alone; and subtracting the sample count rate from the combined count rate to obtain the count rate of the standard alone and thus the counts defining the Compton pulse height spectrum.

6. Apparatus for measuring the degree of quench associated with a sample in a liquid scintillation medium comprising:

means for exposing the sample to radiation from a standard source for interaction therewith to produce Compton scattering of electrons having a Compton scattered electron energy distribution or pulse height spectrum, the pulse height spectrum being defined at a high energy end thereof by a Compton edge configurtion;

means for analyzing the shape of the Compton edge to identify a unique characteristic of the Compton edge and for measuring a pulse height value corresponding thereto; and means for comparing the pulse height value measured for the sample with a pulse height value measured in a like manner for a calibration standard, the difference in the measured pulse height values being indicative of the degree of quench present in the sample.

7. Apparatus for measuring the degree of quench associated with a sample in a liquid scintillation medium comprising:

means for exposing the sample to radiation from a standard source for interaction therewith to produce Compton scattering of electrons having a Compton scattered electron energy distribution or pulse height spectrum, the pulse height spectrum being defined at a high energy end thereof by a Compton edge configuration;

means for analyzing the shape of the Compton edge to identify a unique point on the edge and for measuring the pulse height value corresponding thereto; and means for comparing the pulse height value measured for the sample with a pulse height value measured in a like manner for a calibration standard, the difference in the measured pulse height values being indicative of the degree of quench present in the sample.

8. Apparatus of claim 7 wherein the analyzing means determines the point at which the rate of change of the slope of the Compton edge equals 0.

* * * * *